US011186374B2

(12) United States Patent
Erhel et al.

(10) Patent No.: US 11,186,374 B2
(45) Date of Patent: Nov. 30, 2021

(54) RECLINABLE PASSENGER SEAT

(71) Applicant: BOMBARDIER INC., Dorval (CA)

(72) Inventors: Philippe Erhel, Montreal (CA);
Jerome Vigeant, Montreal (CA)

(73) Assignee: BOMBARDIER INC., Dorval (CA)

(*) Notice: Subject to any disclaimer, the term of this patent is extended or adjusted under 35 U.S.C. 154(b) by 0 days.

(21) Appl. No.: 16/955,572

(22) PCT Filed: Dec. 18, 2018

(86) PCT No.: PCT/CA2018/051614
§ 371 (c)(1),
(2) Date: Jun. 18, 2020

(87) PCT Pub. No.: WO2019/119123
PCT Pub. Date: Jun. 27, 2019

(65) Prior Publication Data
US 2020/0317346 A1 Oct. 8, 2020

Related U.S. Application Data

(60) Provisional application No. 62/608,717, filed on Dec. 21, 2017.

(51) Int. Cl.
B64D 11/06 (2006.01)
B60N 2/22 (2006.01)
(Continued)

(52) U.S. Cl.
CPC ............ B64D 11/064 (2014.12); B60N 2/22 (2013.01); B60N 2/34 (2013.01); B60N 2/506 (2013.01); B60N 2/52 (2013.01); *B60N 2/14* (2013.01)

(58) Field of Classification Search
CPC . B60N 2/34; B60N 2/22; B60N 2/506; B60N 2/52; B60N 2/14; B64D 11/064
(Continued)

(56) References Cited

U.S. PATENT DOCUMENTS 3,540,777 A * 11/1970 Revellide Beaumont ..................
B60N 2/0284
297/284.4
3,819,229 A 6/1974 Rogers, Jr. et al.
(Continued)

FOREIGN PATENT DOCUMENTS

CA 2213760 C 3/1998
EP 1230876 A1 8/2002
(Continued)

OTHER PUBLICATIONS

International Searching Authority, PCT International Search Report and Written Opinion dated Apr. 15, 2019 re: International Application No. PCT/CA2018/051614.
(Continued)

*Primary Examiner* — Milton Nelson, Jr.
(74) *Attorney, Agent, or Firm* — Norton Rose Fulbright Canada LLP

(57) ABSTRACT

A reclinable passenger seat including a base, a seat pan frame having a front end connected to the base via a first fixed pivot, a support arm having one end connected to the base via a second fixed pivot aft of the first fixed pivot, and a backrest frame having an upper backrest member and a lower backrest member. An opposed end of the support arm is pivotally connected to the lower backrest member at a first location spaced from the upper backrest member. A rear end of the seat pan frame is pivotally connected to the lower backrest member at a second location between the first location and the upper backrest member. The backrest frame and seat pan frame are configured to move simultaneously between a sitting configuration and a reclined configuration through pivoting motion about the fixed pivots and about the two locations.

16 Claims, 7 Drawing Sheets

(51) Int. Cl.
  *B60N 2/34* (2006.01)
  *B60N 2/50* (2006.01)
  *B60N 2/52* (2006.01)
  *B60N 2/14* (2006.01)

(58) Field of Classification Search
  USPC .......................................... 297/354.13, 284.3
  See application file for complete search history.

(56) References Cited

U.S. PATENT DOCUMENTS

| | | | |
|---|---|---|---|
| 6,247,753 B1 * | 6/2001 | Alvestad | A47C 20/08 297/362.13 |
| 6,494,536 B2 | 12/2002 | Plant | |
| 8,419,123 B2 | 4/2013 | Hankinson et al. | |
| 9,073,453 B2 | 7/2015 | Erhel | |
| 9,592,914 B2 | 3/2017 | Erhel | |
| 9,714,095 B2 | 7/2017 | Erhel | |
| 9,714,862 B2 | 7/2017 | Erhel | |
| 2009/0021065 A1 | 1/2009 | Brauning | |
| 2013/0256456 A1 | 10/2013 | Malek et al. | |
| 2016/0325837 A1 | 11/2016 | Erhel et al. | |
| 2016/0325838 A1 | 11/2016 | Erhel | |
| 2017/0275003 A1 | 9/2017 | Erhel et al. | |

FOREIGN PATENT DOCUMENTS

| | | |
|---|---|---|
| EP | 3222523 A1 | 9/2017 |
| FR | 3042172 A1 | 4/2017 |
| JP | H0568800 U | 9/1993 |
| JP | 40582337 U | 11/1993 |
| JP | H07250729 A | 10/1995 |
| JP | 2000085424 A | 3/2000 |
| JP | 2015012909 A | 1/2015 |
| WO | 2008083952 A1 | 7/2008 |
| WO | 2015136735 A1 | 9/2015 |

OTHER PUBLICATIONS

English translation of Japan patent document No. JP 2000085424A dated Mar. 28, 2000, https://patents.google.com/patent/JP2000085424A/en?oq=JP2000085424A, accessed on Jun. 22, 2020.
English translation of France patent document No. FR 3042172 dated Apr. 14, 2017, https://patents.google.com/patent/FR3042172A1/en?oq=FR3042172, accessed on Jun. 22, 2020.
English translation of Japan patent document No. JP H0568800 dated Sep. 17, 1993, https://patents.google.com/patent/JPH0568800U/en?oq=jpH0568800, accessed on Jun. 22, 2020.
English translation of Japan patent document No. JP H0582337 dated Nov. 9, 1993, https://patents.google.com/patent/JPH0582337U/en?oq=jpH0582337, accessed on Jun. 22, 2020.
English translation of Japan patent document No. JP H07250729 dated Oct. 3, 1995, https://patents.google.com/patent/JPH07250729A/en?oq=jpH07250729, accessed on Jun. 22, 2020.
English translation of Japan patent document No. JP2015012909 dated Jan. 22, 2015, https://patents.google.com/patent/JP2015012909A/en?oq=jp2015012909, accessed on Jun. 22, 2020.
English translation of international patent document No. WO 2008083952 dated Jul. 17, 2008, https://patents.google.com/patent/WO2008083952A1/en?oq=WO2008083952, accessed on Jun. 22, 2020.
English translation of international patent document No. WO 2015136735 dated Sep. 17, 2015, https://patents.google.com/patent/WO2015136735A1/en?oq=WO2015136735, accessed on Jun. 22, 2020.
English translation of Europe patent document No. EP 1230876 dated Aug. 14, 2002, https://patents.google.com/patent/EP1230876A1/en?oq=EP1230876, accessed on Jun. 22, 2020.

* cited by examiner

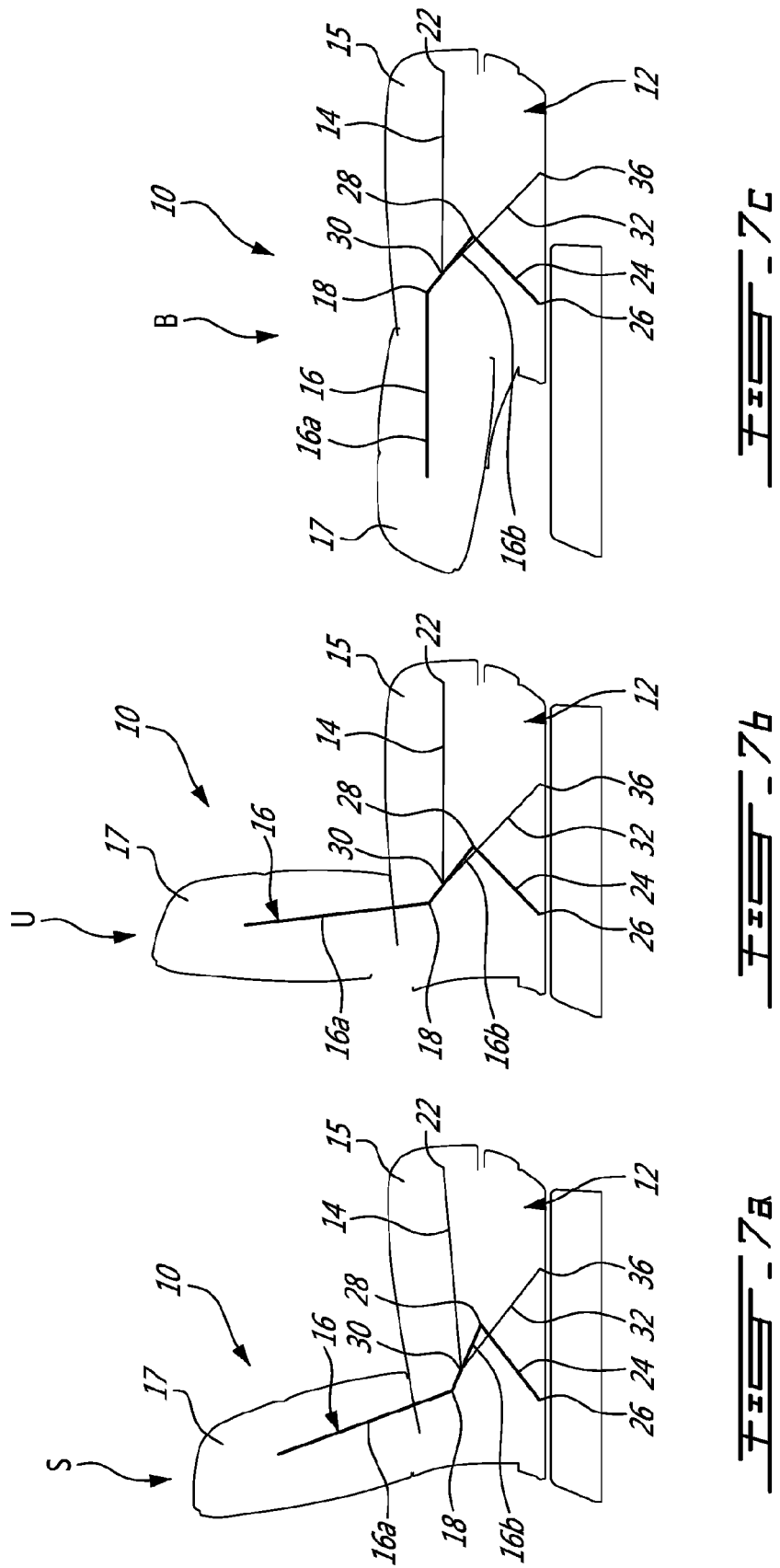

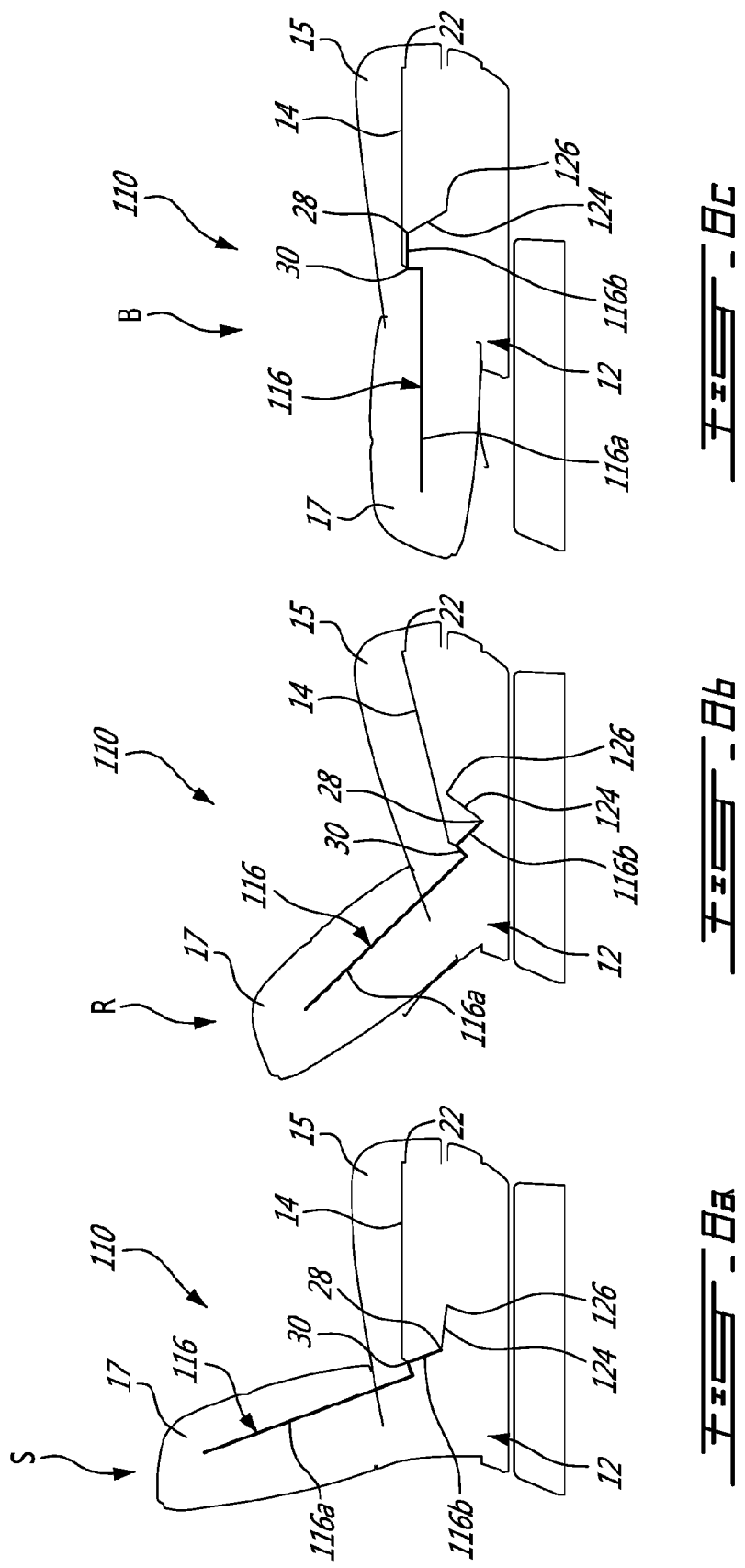

RECLINABLE PASSENGER SEAT

CROSS-REFERENCE TO RELATED APPLICATION(S)

This application is a national phase application under 35 U.S.C. 371 of International Patent Application No. PCT/CA2018/051614 filed on Dec. 18, 2018, which claims priority from U.S. Provisional Patent Application Ser. No. 62/608,717 filed on Dec. 21, 2017, the entire content of which is incorporated herein by reference.

TECHNICAL FIELD

The application relates generally to reclinable passenger seats and, more particularly, to such seats provided in aircraft.

BACKGROUND OF THE ART

A variety of different configurations exist for reclinable seats such as to allow the backrest and seat pan to move between sitting and reclined configurations. Some of these existing configurations include slide mechanisms, for example provided between the base of the seat and the backrest and/or seat pan, where rollers or other suitable sliding elements are received in straight or curved slots to guide the motion of the backrest and/or seat pan with respect to the base. However, slide mechanisms may be prone to misalignment and/or jamming.

SUMMARY

In one aspect, there is provided a reclinable passenger seat comprising: a base configured to be connected to a floor structure; a seat pan frame supporting a seat pan and having a front end connected to the base via a first fixed pivot; a support arm having one end connected to the base via a second fixed pivot located aft of the first fixed pivot; and a backrest frame having an upper backrest member supporting a backrest and a lower backrest member extending downwardly from the upper backrest member, an opposed end of the support arm pivotally connected to the lower backrest member at a first location spaced from the upper backrest member, a rear end of the seat pan frame pivotally connected to the lower backrest member at a second location between the first location and the upper backrest member; wherein the backrest frame and seat pan frame are configured to move simultaneously between a sitting configuration and a reclined configuration through pivoting motion about the first and second fixed pivots and about the first and second locations.

In particular embodiments, the reclinable passenger seat may include any one or any suitable combination of the following:

the upper and lower backrest members are interconnected by a selectively lockable pivot connection having a locked configuration where a relative pivoting motion between the upper and lower backrest members is prevented and an unlocked configuration where the relative pivoting motion between the upper and lower backrest members is allowed;

the second fixed pivot connecting the support arm to the base is located under the backrest frame;

the first and second locations on the lower backrest member remain forward of the second fixed pivot as the backrest frame and seat pan frame move between the sitting configuration and the reclined configuration;

a gas spring having one end pivotally connected to the lower backrest member and to the rear end of the seat pan frame at the first location, and an opposed end pivotally connected to the base by a third fixed pivot located between the first and second fixed pivots;

the first and second locations on the lower backrest member remain aft of the third fixed pivot as the backrest frame and seat pan frame move between the sitting configuration and the reclined configuration;

a distance between the second fixed pivot and the first location is about twice a distance between the first and second locations;

the upper and lower backrest members extend non-parallel to one another;

the upper and lower backrest members extend at an angle of about 135 degrees with respect to one another.

In another aspect, there is provided a reclinable passenger seat comprising: a base configured to be connected to a floor structure; a seat pan frame supporting a seat pan and having a front end connected to the base via a first revolute joint; a support arm having one end connected to the base via a second revolute joint located aft of the first revolute joint; and a backrest frame having an upper backrest member supporting a backrest and a lower backrest member extending downwardly from the upper backrest member, the upper and lower backrest members having at least a first configuration where the upper and lower backrest members have a fixed orientation with respect to one another, an opposed end of the support arm connected to the lower backrest member via a third revolute joint spaced from the upper backrest member, a rear end of the seat pan frame connected to the lower backrest member by a fourth revolute joint located between the third revolute joint and the upper backrest member; wherein the backrest frame and seat pan frame are configured to move simultaneously between a sitting configuration and a reclined configuration through pivoting motion about the first, second, third and fourth revolute joints while the upper and lower backrest members are in the first configuration.

In particular embodiments, the reclinable passenger seat may include any one or any suitable combination of the following:

the upper and lower backrest members are interconnected by a selectively lockable revolute joint, the first configuration being a locked configuration where a relative pivoting motion between the upper and lower backrest members is prevented, the selectively lockable revolute joint having an unlocked configuration where the relative pivoting motion between the upper and lower backrest members is allowed;

the second revolute joint connecting the support arm to the base is located under the backrest frame;

the third and fourth revolute joints on the lower backrest member remain forward of the second revolute joint connecting the support arm to the base as the backrest frame and seat pan frame move between the sitting configuration and the reclined configuration;

a gas spring having one end connected to the fourth revolute joint connecting the seat pan frame to the lower backrest member, and an opposed end pivotally connected to the base by a fifth revolute joint located between the first and second revolute joints;

the third and fourth revolute joints on the lower backrest member remain aft of the fifth revolute joint connecting the gas spring to the base as the backrest frame and seat pan frame move between the sitting configuration and the reclined configuration;

a distance between the second and third revolute joints is about twice a distance between the third and fourth revolute joints;

in the first configuration, the upper and lower backrest members extend non-parallel to one another;

in the first configuration, the upper and lower backrest members extend at an angle of about 135 degrees with respect to one another.

In a further aspect, there is provided a method of inclining a reclinable seat, the method comprising: changing an angle of a seat pan and an angle of a backrest of the seat by simultaneously: pivoting a front end of the seat pan about a first fixed location on a base of the seat; pivoting a support arm about a second fixed location on a base of the seat, the second fixed location being aft of the first fixed location; pivoting the backrest relative to the support arm about a third location on a lower backrest member of the backrest; and pivoting the backrest relative to a rear end of the seat pan about a fourth location on the lower backrest member.

In particular embodiments, the method may include any one or any suitable combination of the following:

a variation in the angle of the backrest has a linear relationship with respect to a variation in the angle of the seat pan;

the method further comprises applying a resistance against a movement of the rear end of the seat pan;

the lower backrest member remains over the support arm as the backrest pivots relative to the rear end and relative to the support arm.

DESCRIPTION OF THE DRAWINGS

For a better understanding of the present invention, as well as other aspects and further features thereof, reference is made to the following description which is to be used in conjunction with the accompanying drawings, where:

FIG. 7a is a schematic side view of the seat of FIGS. 2-4 in the sitting configuration, in accordance with a particular embodiment;

FIG. 7b in a schematic side view of the seat of FIG. 7a in an upright configuration;

FIG. 7c is a schematic side view of the seat of FIG. 7a in a berth configuration;

FIG. 8a is a schematic side view of a seat in accordance with another embodiment, in the sitting configuration;

FIG. 8b in a schematic side view of the seat of FIG. 8a in the reclined configuration; and FIG. 8c is a schematic side view of the seat of FIG. 8a in the berth configuration.

DETAILED DESCRIPTION

Figure 1:
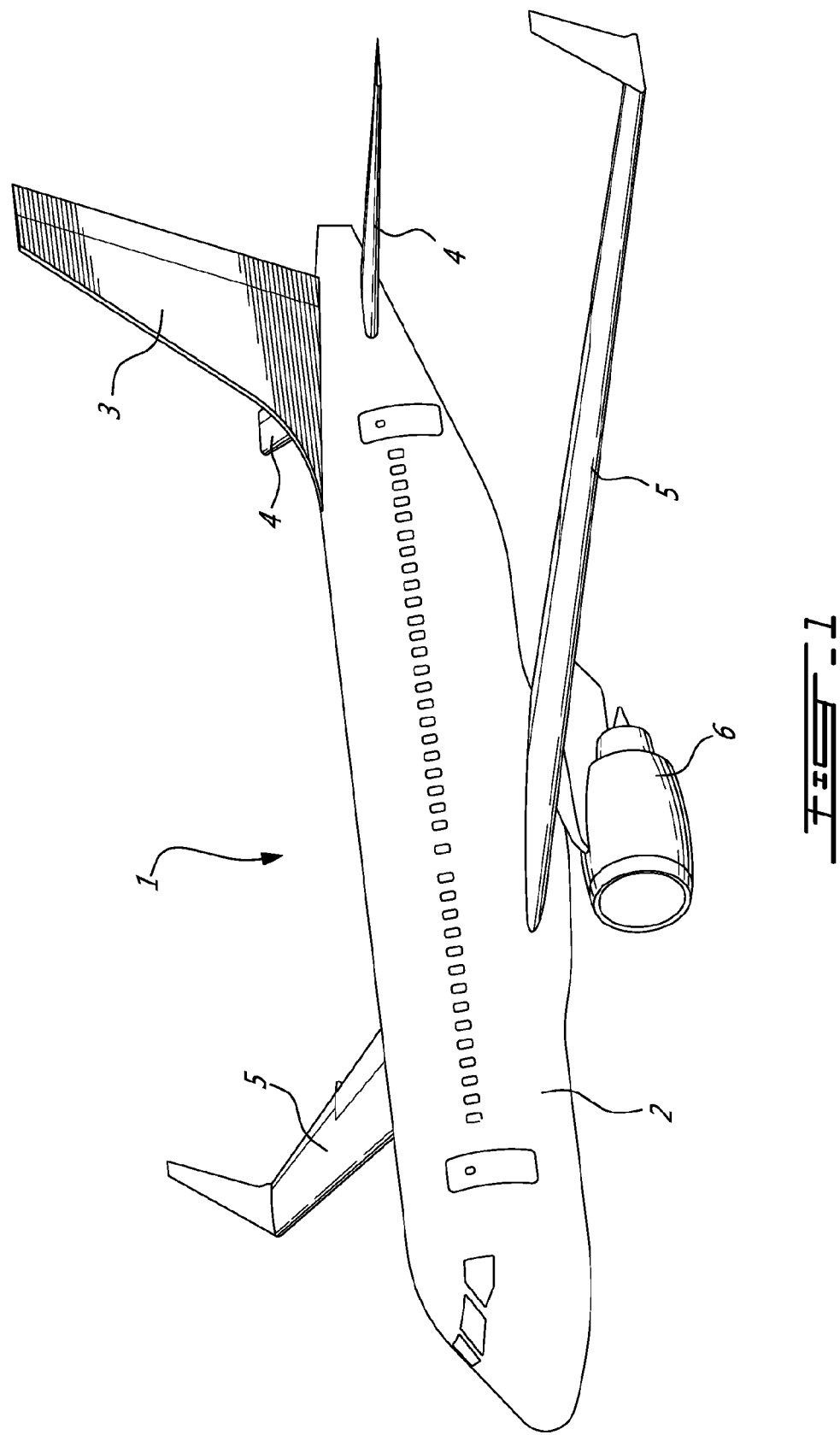
FIG. 1 is a schematic tridimensional view of an aircraft.

Referring to the drawings and more particularly to FIG. 1, an aircraft is shown at 1 and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft. It is also understood that although FIG. 1 shows a commercial aircraft, the aircraft 1 may alternately be any other type of aircraft, including, but not limited to, a business aircraft or a private aircraft.

Referring to FIGS. 2-5, a passenger seat 10 in accordance with a particular embodiment is shown. The passenger seat 10 is configured to be used, for example, in the cabin of an aircraft 1 such as shown in FIG. 1. The passenger seat 10 could alternately be used in any other suitable type of vehicle.

Figure 2:
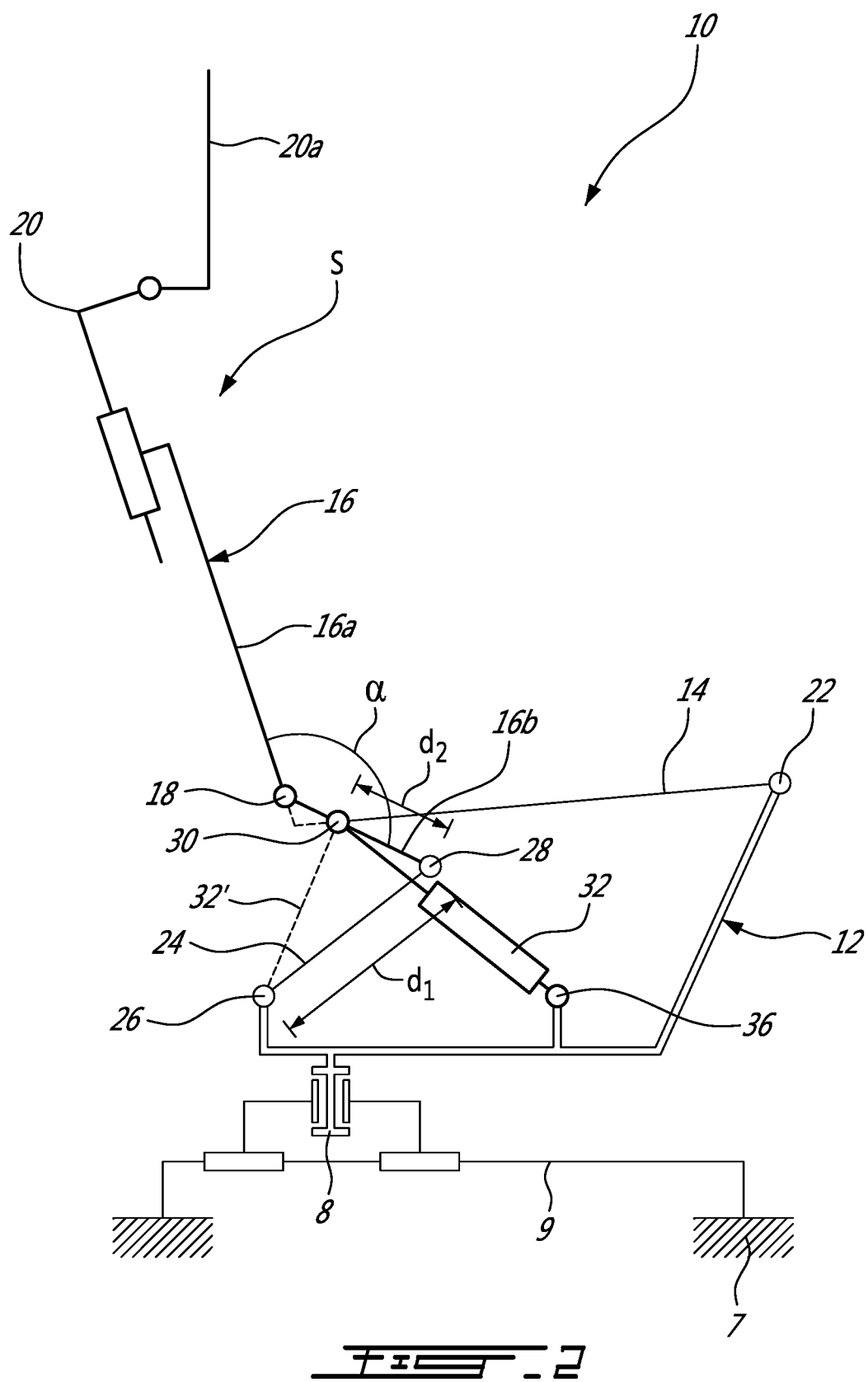
FIG. 2 is a schematic diagram of the structure of a seat which can be used in an aircraft such as shown in FIG. 1, in accordance with a particular embodiment.

Referring particularly to FIG. 2, the seat 10 includes a base or carrier 12 which is configured to be connected to a floor structure 7, for example to floor beams interconnected to the fuselage 2. In the embodiment shown, the base 12 is connected to a pivot 8 which is slidingly received on rails 9 attached to the floor structure 7, allowing the base 12 to be displaced along a limited path defined by the rails 9 and pivoted about the pivot 8; the pivot 8 is located toward the rear of the base 12, such that a greater part of the base 12 is located in front if the pivot 8. It is however understood that the attachment between the base 12 and floor structure 7 shown here is exemplary only and that any other suitable type of attachment may alternately be used, including, but not limited to, pivoting attachments, sliding attachments, and fixed attachments.

Figure 3:
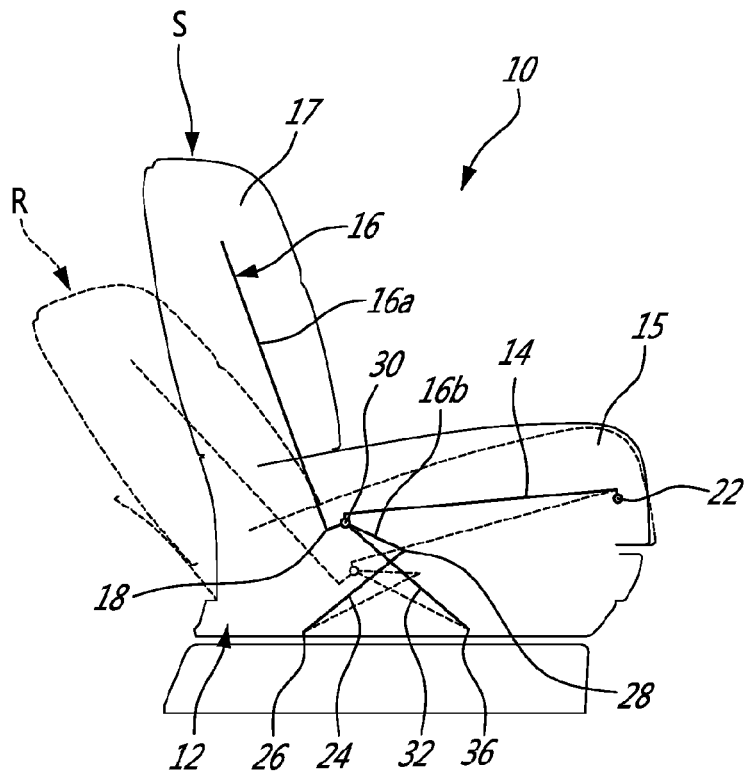
FIG. 3 is a schematic side view of the seat of FIG. 2 shown in sitting and reclined configurations, in accordance with a particular embodiment.

Referring particularly to FIG. 3, the seat 10 generally includes a seat pan frame 14 supporting a seat pan 15, and a backrest frame 16 supporting a backrest 17. It is understood that the seat pan 15 and backrest 17 may include any material suitable for providing appropriate support and comfort to the occupant, including, but not limited to, suitable cushioning materials which will not be further described herein. The seat 10 is selectively configurable between a sitting configuration S shown in full lines and a reclined configuration R shown in dotted lines. In a particular embodiment, the sitting configuration S corresponds to a taxi, take-off and landing (TTOL) configuration.

Figure 4:
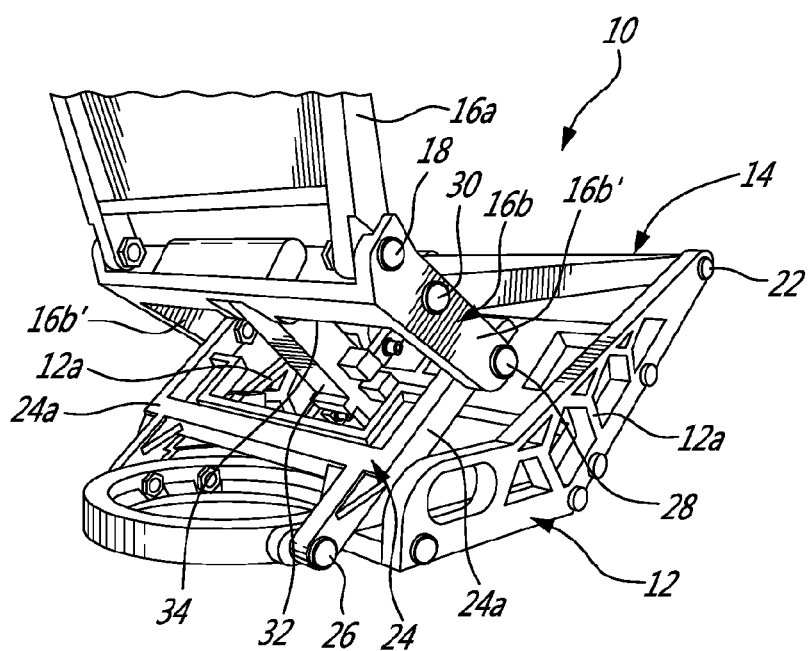
FIG. 4 is a schematic rear tridimensional view of part of the seat of FIGS. 2-3, in accordance with a particular embodiment.

Referring to FIGS. 2-4, the backrest frame 16 has an upper backrest member 16a supporting the backrest 17, and a lower backrest member 16b extending downwardly from a bottom end of the upper backrest member 16a. In the embodiment shown, the upper and lower backrest members 16a, 16b are pivotally interconnected by a selectively lockable pivot connection 18, e.g. a selectively lockable revolute joint. In the present disclosure, including claims, the term "revolute joint" is intended to designate a pivot connection between two members which allows relative pivoting motion between the two members about an axis of rotation without allowing relative translation between the two members, i.e. the axis of rotation has a fixed location with respect to each of the two members. Examples of revolute joints include, but are not limited to, a hinge joint, a pin joint, and a folding joint.

The pivot connection 18 between the upper and lower backrest members 16a, 16b has a locked configuration where a relative pivoting motion between the upper and lower backrest members 16a, 16b is prevented and an unlocked configuration where the relative pivoting motion between the upper and lower backrest members 16a, 16b is allowed. The pivot connection 18 may include, for example, a lock based on a spring-loaded plunger mechanism; any other suitable mechanism may alternately be used. As will be detailed further below, in a particular embodiment the upper and lower backrest members 16a, 16b remain with a fixed relative orientation with respect to one another (i.e. the pivot connection 18 between the upper and lower backrest members 16a, 16b remains in the locked configuration) as the seat 10 is moved from the sitting configuration S to the reclined configuration R, and from the reclined configuration R to the sitting configuration S; the pivot connection is only unlocked when the seat 10 is moved to a berth configuration B (FIG. 7c). In the embodiment shown, the upper and lower backrest members 16a, 16b are non-parallel when in the locked configuration. It is understood that in an alternate embodiment, the upper and lower backrest members 16a, 16b may be rigidly interconnected.

Referring particularly to FIG. 2, in the embodiment shown, the backrest 17 also includes a headrest 20 which is slidingly engaged to a top of the upper backrest member 16a. The headrest 20 may include a pivotable portion 20a allowing for further adjustment of the position of the headrest 20. It is understood that the headrest configuration shown is exemplary only, and that any other suitable headrest configuration may alternately be used; alternately, the adjustable headrest may be omitted.

The front end of the seat pan frame 14 is connected to the front of the base 12 via a pivot connection 22, which in the embodiment shown is defined by a revolute joint or fixed pivot, i.e. a pivot having a fixed location on the base 12. Referring particularly to FIG. 4, in a particular embodiment, the base 12 includes two laterally spaced interconnected portions 12a; the front end of the seat pan frame 14 is received between the front ends of the base portions 12a and is pivotally connected thereto. The pivot connection 22 may be defined by a single pivot interconnecting the front end of the seat pan frame 14 to both base portions 12a, or by separate pivots interconnecting the front end of the seat pan frame 14 to each base portion 12a. Other configurations are also possible.

Referring back to FIGS. 2-4, the backrest frame 16 is connected to the base 12 by a support arm 24 and is free of direct connections with the base 12. The support arm 24 has one end connected to the base 12 via another pivot connection 26, which in the embodiment shown is also defined as a fixed pivot or revolute joint. The pivot connection 26 between the support arm 24 and the base 12 is located aft of the pivot connection 22 between the front end of the seat pan frame 14 and the base 12 and, in the embodiment shown, is located at the rear of the base 12. The pivot connection 22 between the front end of the seat pan frame 14 and the base 12 is upwardly offset with respect to the pivot connection 26 between the support arm 24 and the base 12.

The support arm 24 has an opposed end pivotally connected to the lower backrest member 16b by another pivot connection 28 defined at a location spaced from the upper backrest member 16a. In the embodiment shown, the pivot connection 28 between the support arm 24 and the lower backrest member 16b is defined by another revolute joint.

Referring particularly to FIG. 4, in a particular embodiment, the support arm 24 includes two laterally spaced interconnected rods 24a, and the lower backrest member 16b includes two laterally spaced interconnected portions 16b'. The pivot connection 28 between the support arm 24 and the lower backrest member 16b is defined by separate pivots interconnecting the end of each of the lower backrest member portions 16b' to the end of a respective one of the rods 24a, and the pivot connection between the support arm 24 and the base 12 is defined by separate pivots interconnecting the other end of each of the rods 24a to the base 12. Other configurations are also possible.

Referring back to FIGS. 2-4, the backrest frame 16 and seat pan frame 14 are also interconnected: the rear end of the seat pan frame 14 is pivotally connected to the lower backrest member 16b by another pivot connection 30 defined at a location between the upper backrest member 16a and the pivot connection 28 between the support arm 24 and the lower backrest member 16b. In the embodiment shown, the pivot connection between the lower backrest member 16b and the rear end of the seat pan frame 14 is defined by another revolute joint. Referring particularly to FIG. 4, in a particular embodiment, the pivot connection 30 between the lower backrest member 16b and the seat pan frame 14 is defined by a single pivot interconnecting both lower backrest member portions 16' to the rear end of the seat pan frame 14. Other configurations are also possible.

Referring to FIG. 3, the backrest frame 16 and seat pan frame 14 move simultaneously between the sitting configuration S and the reclined configuration R through pivoting motion about the four pivot connections 22, 26, 28, 30 defined between the seat pan frame 14 and the base 12, between the support arm 24 and the base 12, between the support arm 24 and the lower backrest member 16b, and between the lower backrest member 16b and the seat pan frame 14, while the upper and lower backrest members 16a, 16b remain at a fixed orientation with respect to one another, e.g. while the pivot connection 18 between the upper and lower backrest members 16a, 16b remains in the locked configuration.

It can be seen that the pivot connection 26 between the support arm 24 and the base 12 is located under the backrest frame 16, and the backrest frame 16 remains over this pivot connection 26 throughout the motion of backrest frame 16 and seat pan frame 14 between the sitting and reclined configurations S, R. The support arm 24 also remains under the backrest frame 16, and the two pivot connections 28, 30 of the lower backrest member 16b remain forward of and higher than the pivot connection 26 between the support arm 24 and the base 12 throughout this motion.

Referring to FIG. 2, in a particular embodiment, the effective length $d_1$ of the support arm 24 defined by the distance between the two pivot connections 26, 28 of the support arm 24, the effective length $d_2$ of the lower backrest member 16b defined by the distance between the two pivot connections 28, 30 of the lower backrest member 16b, and the angle $\alpha$ between the upper and lower backrest members 16a, 16b when in the locked configuration are selected so that the variation in the angle of the backrest 17 has a linear relationship with respect to a variation in the angle of the seat pan 15 as the seat pan frame 14 and backrest frame 16 are moved between the sitting and reclined configurations S, R.

Figure 5:
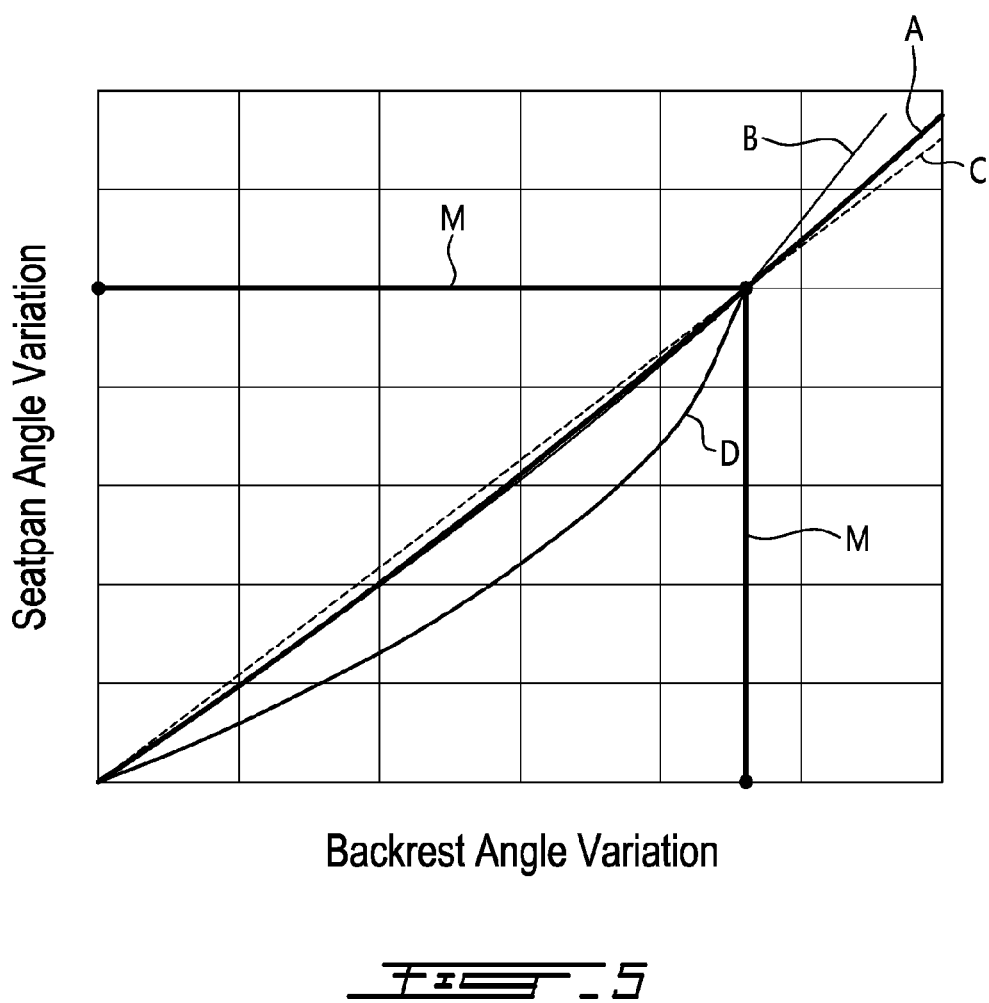
FIG. 5 is a diagram of an angle variation of the seat pan in relation to an angle variation of the backrest of the seat of FIGS. 2-4 upon movement between the sitting and reclined configurations, in accordance with a particular embodiment.

FIG. 5 shows examples of the angle variation of the seat pan in relation to the angle variation of the backrest for different seat configurations, with lines M showing maximum targeted variations. Curve A shows a theoretical linear relationship, while curves B and C show relationships which are sufficiently close to the theoretical linear relationship A to be characterized as linear. In a particular embodiment, curve B corresponds to the seat 10 of FIGS. 2-4 where the effective length $d_1$ of the support arm 24 is twice or about twice the effective length $d_2$ of the lower backrest member 16$b$, and where the upper and lower backrest members 16$a$, 16$b$ extend at an angle α of 135 degrees or about 135 degrees to each other in the locked configuration. In another embodiment, the effective length $d_1$ of the support arm 24 is about 1.875 times the effective length $d_2$ of the lower backrest member 16$b$ with the angle α being 135 degrees or about 135 degrees. In a particular embodiment, the effective length $d_2$ of the lower backrest member 16$b$ is about ¼ the length of the seat pan frame 14 as measured between its pivot connections 22, 30, and the effective length $d_1$ of the support arm 24 is from 1.875 to 2 times the effective length $d_2$ of the lower backrest member 16$b$ with the angle α being 135 degrees or about 135 degrees. In a particular embodiment, all these combinations of values are applicable for a seat pan depth of 16 inches, and a recline angle range of 5 to 15 degrees for the seat pan and 20 to 43 degrees for the backrest. Other values are also possible. By contrast, curve D shows a relationship which is not linear; in a particular embodiment, this corresponds to a seat where the upper and lower backrest members 16$a$, 16$b$ are parallel or approximately parallel, and where the effective length $d_1$ of the support arm 24 is more than twice the effective length $d_2$ of the lower backrest member 16$b$. In a particular embodiment, the linear relationship between the variation in the angle of the seat pan 15 and the variation in the angle of the backrest 17 provides for a more stable motion between the sitting and reclined configurations S, R, which may be easier to operate and/or more comfortable for the occupant, then a seat where the relationship is not linear.

Referring back to FIG. 2, the seat 10 further includes a biasing and/or damping member, for example a gas spring 32 or any suitable type of linear actuator located under the seat pan frame 14. In a particular embodiment, having the gas spring 32 located under the seat pan frame 14 as opposed to in behind the backrest frame 16 allows for the backrest 17 to have a reduced thickness, which may provide increased free space for the occupant(s) of the adjacent seat(s).

In the embodiment shown, the gas spring 32 has one end pivotally connected to the lower backrest member 16$b$ and to the rear end of the seat pan frame 14 at the pivot connection 30 between the lower backrest member 16$b$ and the rear end of the seat pan frame 14. For example and referring to FIG. 4, the lower backrest member 16$b$ and the rear end of the seat pan frame 14 may be interconnected by a revolute joint defined by a rod 34, with the lower backrest member portions 16$b$' and the rear end of the seat pan frame 14 pivotally engaged to the rod 34 adjacent its ends, and the end of the gas spring 32 pivotally engaged to a central portion of the rod 34. Other configurations are of course possible.

Referring back to FIG. 2, the opposed end of the gas spring 32 is pivotally connected to the base 12 by a pivot connection 36, which in the embodiment shown is also defined as a fixed pivot or revolute joint. The pivot connection 36 between the gas spring 32 and the base 12 is located between the pivot connections 22, 26 of the base 12 with the front end of the seat pan frame 14 and with the support arm 24.

In a particular embodiment, the gas spring 32 is positioned so that the movement of its end connected to the lower backrest member 16$b$ and to the seat pan frame 14 is as close as possible to the axis of the gas spring 32 so as to maximize the efficiency of the gas spring 32. In a particular embodiment, the gas spring 32 is selected so that its stroke during the motion of the seat pan frame 14 and backrest frame 16 is at most ⅓ of the total extended length of the gas spring 32; other values are also possible.

In the embodiment shown, the gas spring 32 is connected toward the front of the base 12, so that its connection with the base 12 remains forward of its connection with the lower backrest member 16$b$ and seat pan frame 14 throughout the motion of backrest frame 16 and seat pan frame 14 between the sitting and reclined configurations S, R. It can be seen from FIG. 3 that the pivot connections 28, 30 of the lower backrest member 16$b$ remain aft of the pivot connection 36 between the gas spring 32 and the base 12 as the backrest frame 16 and seat pan frame 14 move between the sitting configuration S and the reclined configuration R.

Figure 6:
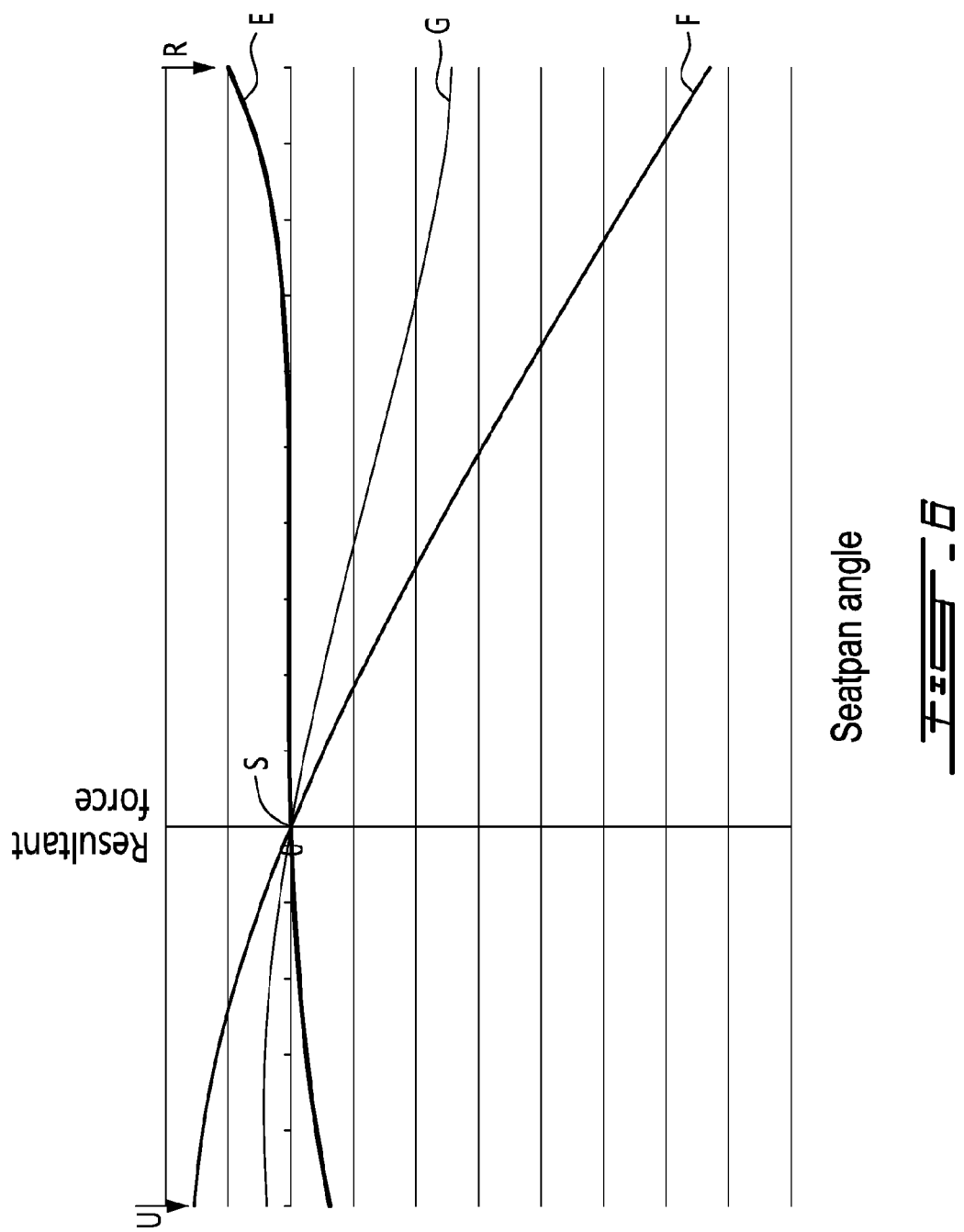
FIG. 6 is a diagram of the resultant force created by two gas springs, used alone and in combination, in the seat of FIGS. 2-4 as a function of the seat pan angle upon movement between the sitting and reclined configurations, in accordance with particular embodiments.

Referring to FIG. 6, in a particular embodiment the attachment of the gas spring 32 toward the front of the base 12 and forwardly of the backrest frame 16 allows for the resultant force on the backrest and normal to the backrest (i.e. the resultant force pushing on the occupant back) for a constant force applied by the gas spring 32 to increase near the reclined configuration R, such as shown for example by curve E. By contrast, curve F corresponds to a gas spring 32' attached toward the rear of the base 12, for example between the pivot connection between the lower backrest member 16$b$ and the seat pan frame 14 and the pivot connection 26 between the support arm 24 and the base 12 (see dotted lines in FIG. 2); it can be seen that the resultant force is decreasing from the sitting configuration S to the reclined configuration R. Curve G shows the resultant force when the two gas springs 32, 32' are provided, one attached toward the front of the base 12 and another toward the rear; it can be seen that in this configuration, the resultant force also decreases at the reclined configuration R. In a particular embodiment, having the resultant force increasing toward the reclined configuration as per curve E provides for a more comfortable transition from the sitting configuration S to the reclined configuration R for the occupant.

Referring to FIG. 7$b$, in a particular embodiment the seat 10 also has an upright configuration U, where the backrest 17 is closer to the vertical (more upright) than in the sitting configuration S (FIG. 7$a$) and/or where the seat pan frame 14 is horizontal or approximately horizontal. The seat pan frame 14 and backrest frame 16 move simultaneously between the sitting configuration S (FIG. 7$a$) and the upright configuration U (FIG. 7$b$) through pivoting motion about the four pivot connections 22, 26, 28, 30 defined between the seat pan frame 14 and the base 12, between the support arm 24 and the base 12, between the support arm 24 and the lower backrest member 16$b$, and between the lower backrest member 16$b$ and the seat pan frame 14, while the upper and lower backrest members 16$a$, 16$b$ remain at a fixed orientation with respect to one another, e.g. while the pivot connection 18 between the upper and lower backrest members 16$a$, 16$b$ remains in the locked configuration.

Referring to FIG. 7$c$, in a particular embodiment the seat 10 also has a berth configuration B, where the backrest 17 and seat pan 15 are aligned or approximately aligned, for example so that the seat 10 may serve as a bed. In the embodiment shown, the seat 10 is configured between the upright configuration U and the berth configuration B by unlocking the pivot connection 18 between the upper and lower backrest members 16a, 16b, and pivoting the upper backrest member 16a rearwardly with respect to the lower backrest member 16b about the unlocked pivot connection 18. The position of the support arm 24, seat pan frame 14 and lower backrest member 16b is the same between the upright configuration U (FIG. 7b) and the berth configuration B (FIG. 7c), i.e. the seat 10 is configured between the upright configuration U and the berth configuration B without any pivoting motion about the four pivot connections 22, 26, 28, 30 defined between the seat pan frame 14 and the base 12, between the support arm 24 and the base 12, between the support arm 24 and the lower backrest member 16b, and between the lower backrest member 16b and the seat pan frame 14.

Referring to FIGS. 8a, 8b and 8c, a seat 110 in accordance with another embodiment is shown, where elements similar to the corresponding elements of the seat 10 of FIGS. 2-4 are identified by the same reference numerals and will not be further described herein. In this embodiment, the upper and lower backrest members 116a, 116b have a fixed orientation with respect to one another (i.e. are rigidly interconnected), and are parallel or approximately parallel to each other. The pivot connection 126 between the support arm 124 and the base 12 is forwardly offset with respect to the corresponding pivot connection 26 of the seat of FIGS. 2-4: the pivot connection 126 between the support arm 124 and the base 12 remains in front of the two pivot connections 28, 30 of the lower backrest member 116b and in front of the backrest frame 116 throughout the motion of the backrest frame 116 and seat pan frame 14 between the sitting configuration S (FIG. 8a), reclined configuration R (FIG. 8b), and berth configuration B (FIG. 8c). The pivot connection 126 between the support arm 124 and the base 12 is lower than the lower backrest member 116b in the sitting configuration S and in the berth configuration B, but is higher than the lower backrest member 116b in the reclined configuration R.

In a particular embodiment, this configuration allows for the seat 10 to be configured from the sitting configuration S (FIG. 8a) to the reclined configuration R (FIG. 8b) and from the sitting configuration S or reclined configuration R to the berth configuration B (FIG. 8c) through pivoting motion about the four pivot connections 22, 126, 28, 30 defined between the seat pan frame 14 and the base 12, between the support arm 124 and the base 12, between the support arm 124 and the lower backrest member 116b, and between the lower backrest member 116b and the seat pan frame 14, without the need for relative motion between the upper and lower backrest member 116a, 116b. However, in a particular embodiment, the attachment of the support arm 124 toward the front and the support arm 124 located forwardly of the backrest frame 116 may provide for a seat motion which may be less stable and/or more complex than that of the seat 10 of FIGS. 2-4

In a particular embodiment and in use, reclining the seat 10, 110 includes changing the angle of the seat pan 15 and the angle of the backrest 17 by simultaneously pivoting the front end of the seat pan 15 about a first fixed location defined by the pivot connection 22 between the seat pan frame 14 and the base 12, pivoting the support arm 24, 124 about a second fixed location defined by the pivot connection 26, 126 between the support arm 24, 124 and the base 12 and which is located aft of the first fixed location 22, pivoting the backrest 17 relative to the support arm 24, 124 about a third location defined by the pivot connection 28 between the support arm 24, 124 and the lower backrest member 16b, 116b, and pivoting the backrest 17 relative to the rear end of the seat pan 15 about a fourth location defined by the pivot connection 30 between the seat pan frame 14 and the lower backrest member 16b, 116b.

In a particular embodiment, reclining the seat 10, 110 includes applying a resistance against the movement of the rear end of the seat pan 15, for example with the gas spring 32, 32'.

In a particular embodiment, the configuration of the pivot connections 22, 26, 126, 28, 30 allows for the motion of the seat 10, 110 to be easier and/or more comfortable when compared to a similar seat having one or more sliding mechanism(s) involved in the motion of the seat. In a particular embodiment, the configuration of the pivot connections 22, 26, 126, 28, 30 allows for a range of motion for the seat 10, 110 similar to that of a seat having one or more sliding mechanism(s).

While the methods and systems described herein have been described and shown with reference to particular steps performed in a particular order, it will be understood that these steps may be combined, sub-divided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A reclinable passenger seat comprising:
   a base configured to be connected to a floor structure;
   a seat pan frame supporting a seat pan and having a front end connected to the base via a first fixed pivot;
   a support arm having one end connected to the base via a second fixed pivot located aft of the first fixed pivot;
   a backrest frame having an upper backrest member supporting a backrest and a lower backrest member extending downwardly from the upper backrest member, an opposed end of the support arm pivotally connected to the lower backrest member at a first location spaced from the upper backrest member, a rear end of the seat pan frame pivotally connected to the lower backrest member at a second location between the first location and the upper backrest member; and
   a linear actuator having one end pivotally connected to the lower backrest member and to the rear end of the seat pan frame at the first location, and an opposed end pivotally connected to the base by a third fixed pivot located between the first and second fixed pivots;
   wherein the backrest frame and seat pan frame are configured to move simultaneously between a sitting configuration and a reclined configuration through pivoting motion about the first and second fixed pivots and about the first and second locations.

2. The reclinable passenger seat as defined in claim 1, wherein the upper and lower backrest members are interconnected by a selectively lockable pivot connection having a locked configuration where a relative pivoting motion between the upper and lower backrest members is prevented and an unlocked configuration where the relative pivoting motion between the upper and lower backrest members is allowed.

3. The reclinable passenger seat as defined in claim 1, wherein the second fixed pivot connecting the support arm to the base is located under the backrest frame.

4. The reclinable passenger seat as defined in claim 3, wherein the first and second locations on the lower backrest member remain forward of the second fixed pivot as the backrest frame and seat pan frame move between the sitting configuration and the reclined configuration.

5. The reclinable passenger seat as defined in claim 1, wherein a distance between the second fixed pivot and the first location is about twice a distance between the first and second locations.

6. The reclinable passenger seat as defined in claim 1, wherein the first and second locations on the lower backrest member remain aft of the third fixed pivot as the backrest frame and seat pan frame move between the sitting configuration and the reclined configuration.

7. The reclinable passenger seat as defined in claim 1, wherein the upper and lower backrest members extend non-parallel to one another.

8. The reclinable passenger seat as defined in claim 7, wherein the upper and lower backrest members extend at an angle of about 135 degrees with respect to one another.

9. A reclinable passenger seat comprising:
- a base configured to be connected to a floor structure;
- a seat pan frame supporting a seat pan and having a front end connected to the base via a first revolute joint;
- a support arm having one end connected to the base via a second revolute joint located aft of the first revolute joint;
- a backrest frame having an upper backrest member supporting a backrest and a lower backrest member extending downwardly from the upper backrest member, the upper and lower backrest members having at least a first configuration where the upper and lower backrest members have a fixed orientation with respect to one another, an opposed end of the support arm connected to the lower backrest member via a third revolute joint spaced from the upper backrest member, a rear end of the seat pan frame connected to the lower backrest member by a fourth revolute joint located between the third revolute joint and the upper backrest member; and
- a linear actuator having one end connected to the fourth revolute joint connecting the seat pan frame to the lower backrest member, and an opposed end pivotally connected to the base by a fifth revolute joint located between the first and second revolute joints;
- wherein the backrest frame and seat pan frame are configured to move simultaneously between a sitting configuration and a reclined configuration through pivoting motion about the first, second, third and fourth revolute joints while the upper and lower backrest members are in the first configuration.

10. The reclinable passenger seat as defined in claim 9, wherein a distance between the second and third revolute joints is about twice a distance between the third and fourth revolute joints.

11. The reclinable passenger seat as defined in claim 9, wherein the upper and lower backrest members are interconnected by a selectively lockable revolute joint, the first configuration being a locked configuration where a relative pivoting motion between the upper and lower backrest members is prevented, the selectively lockable revolute joint having an unlocked configuration where the relative pivoting motion between the upper and lower backrest members is allowed.

12. The reclinable passenger seat as defined in claim 9, wherein the second revolute joint connecting the support arm to the base is located under the backrest frame.

13. The reclinable passenger seat as defined in claim 12, wherein the third and fourth revolute joints on the lower backrest member remain forward of the second revolute joint connecting the support arm to the base as the backrest frame and seat pan frame move between the sitting configuration and the reclined configuration.

14. The reclinable passenger seat as defined in claim 9, wherein the third and fourth revolute joints on the lower backrest member remain aft of the fifth revolute joint connecting the linear actuator to the base as the backrest frame and seat pan frame move between the sitting configuration and the reclined configuration.

15. The reclinable passenger seat as defined in claim 9, wherein in the first configuration, the upper and lower backrest members extend non-parallel to one another.

16. The reclinable passenger seat as defined in claim 15, wherein in the first configuration, the upper and lower backrest members extend at an angle of about 135 degrees with respect to one another.

\* \* \* \* \*